Figure 1:
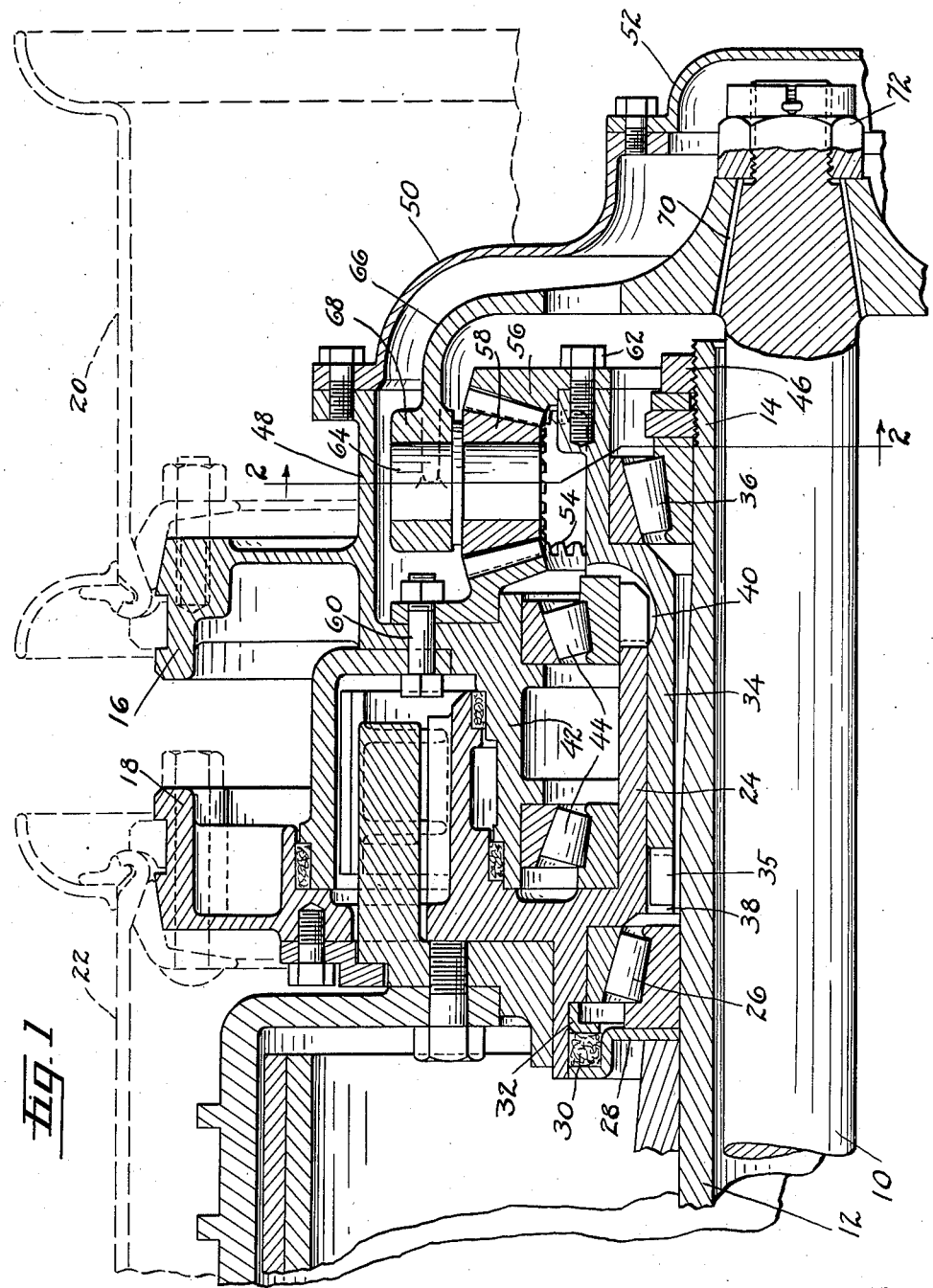

Jan. 3, 1939.   J. F. HIGBEE   2,142,787
DUAL WHEEL ASSEMBLY
Filed Dec. 30, 1936   2 Sheets-Sheet 2

INVENTOR.
JAMES F. HIGBEE
BY Parker & Burton
ATTORNEYS.

Patented Jan. 3, 1939

2,142,787

UNITED STATES PATENT OFFICE 2,142,787

DUAL WHEEL ASSEMBLY

James F. Higbee, Detroit, Mich.

Application December 30, 1936, Serial No. 118,233

4 Claims. (Cl. 180—22)

My invention relates to dual wheel vehicle supporting assemblies and has particular reference to an improved type of wheel assembly constituting a further development of the invention described in my copending application, Serial No. 102,835, filed September 28, 1936.

Independently rotatable dual wheels are important in preserving the lives of the tires and assisting in turning the vehicle on the road. An important object of this invention is to provide an improved dual wheel assembly for motor vehicles which not only supports the load of the vehicle but also is arranged to drive the same. Another object of this invention is to provide a novel differential drive mechanism for the dual wheel assembly which is arranged to permit relative movement of the wheels in each assembly while transmitting a driving torque thereto from a single source of power.

Another important object of this invention is to provide a dual wheel drive assembly for motor vehicles in which the wheels thereof are driven differentially by a single transverse drive axle. Thus the dual wheel assemblies are capable of being driven differentially by the conventional propelling mechanism of a motor vehicle without any change or very little change in the design of the propelling mechanism, and the two wheels in each assembly may be relatively differentially driven. Furthermore, it is possible as a result of this invention to construct differentially driven dual wheel structures in the form of units which can be readily mounted upon or removed from conventional axle structures of motor vehicles.

More particularly, an important object of this invention is to provide an improved dual wheel assembly for motor vehicles having differentially driven wheels and in which the mechanism for producing the differential drive is located. In carrying out this feature of the invention, the dual wheel assembly is specially constructed to provide a housing in which a differential gear mechanism is disposed. This mechanism forms a part of the assembly, being attachable and removable therewith. The differential mechanism thus provided is arranged circumferentially around a non-rotative axle shaft or housing upon which the wheel assembly rotates. Coaxially mounted within this housing is a live axle which may be of conventional design and which is connected in conventional manner to a propelling mechanism associated with the engine of the vehicle.

Another object of this invention is to provide an improved dual wheel assembly for motor vehicles including independently rotatable dual wheels and a novel brake applying mechanism for retarding the rotation of these wheels. The brake mechanism including the housing therefor is associated in a novel way with the housing for the differential drive previously described. The structural relationship of these parts of the wheel assembly has been designed for economical construction and compact association.

Figure 2:
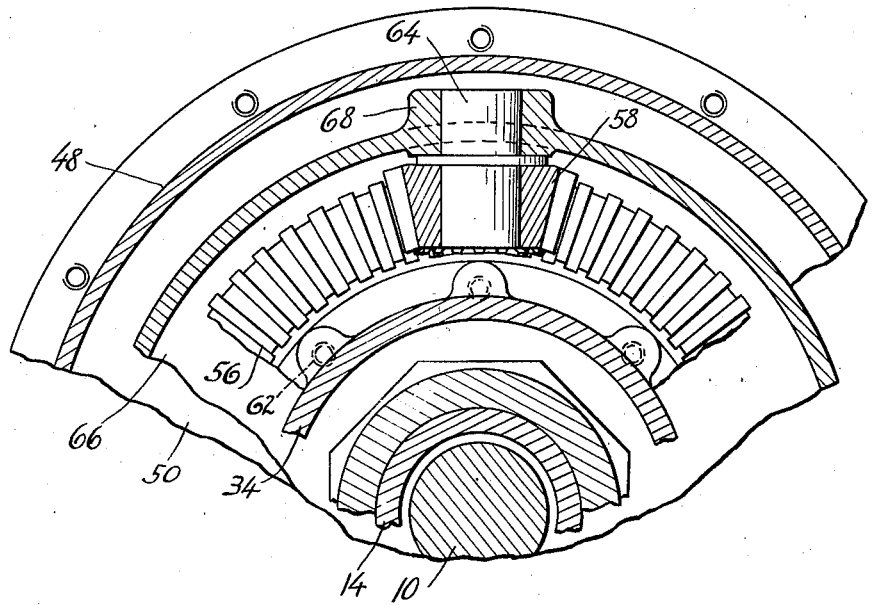
Figure 3:
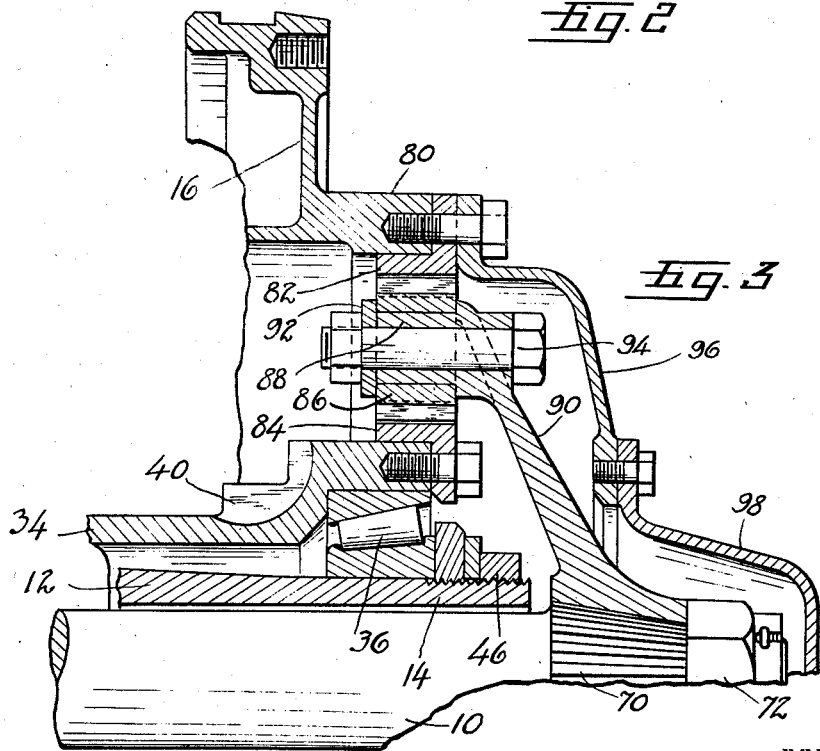

Various other objects, advantages and meritorious features of this invention will be apparent from the following description, appended claims and accompanying drawings, wherein:

Figure 1 is a vertical section through the center of the dual wheel assembly illustrating the construction and association of the differential mechanism for driving the wheels at the same or relatively different speeds, Fig. 2 is a cross-sectional view of the assembly along line 2—2 of Fig. 1, and Fig. 3 is a detail cross-sectional view illustrating a modified form of differential drive for dual wheels falling within the scope of this invention.

Referring now to Fig. 1, the numeral 10 represents a live or drive axle which is connected at its inner end to a propelling mechanism associated with the engine of the vehicle. Although not illustrated herein it is understood that a conventional propelling mechanism including a propeller drive shaft extending longitudinally of the vehicle and a differential gear mechanism joining the end of the propeller shaft to the axle 10 may be employed. In the usual construction, two such shafts 10 lead from opposite sides of the differential mechanism at the end of propeller shaft, one to the right wheel and the other to the left wheel. In this instance a second differential mechanism is intended to be employed in each dual wheel assembly on each side of the vehicle. Thus it may be helpful to consider the differential mechanism at the end of the propeller shaft as the primary differential mechanism and the differential mechanisms employed in the dual wheel assemblies as secondary differential mechanisms.

To support the dual wheel assemblies on either side of the vehicle, suitable means such as a hollow rigid shaft or housing 12 may be provided. In the drawings, one dual wheel assembly is shown and it is understood that the one provided on the other side of the vehicle is a duplicate. The dual wheel assembly is supported upon the outer end of the shaft 12, it being understood that its threaded extremity 14 represents such end. The primary differential assembly, not here shown, is disposed at the opposite end of the shaft 10 and is coupled therewith in a conventional well understood manner to drive the shaft.

Referring to the dual wheel structure in particular, the outer wheel is indicated at 16 and the inner wheel at 18. Wheel structures 16 and 18 support rim structures 20 and 22 respectively in any suitable manner such as that shown in my Patent No. 1,975,273. The inner wheel 18 is provided with a hub portion 24 which extends along the housing 12 and is journaled thereabout upon the rotary bearing assembly 26. A suitable thrust plate 28 and packing ring 30 associated therewith position the bearing assembly 26 and protect the same from dust and dirt. An angular retaining ring 32 may be employed to support the packing ring 30 upon a shoulder on the thrust plate in the manner shown in Fig. 1.

The hub portion 24 of the inner wheel encircles the axle housing 12 in spaced relation. Received between the hub 24 and the housing is a hub 34 rotatably journaled about the axle housing by the bearing assembly 36. The hubs 24 and 34 are keyed together in any suitable manner for joint rotation. As shown in the drawings, hub 24 is provided with a series of teeth 38 depending radially therefrom and hub 34 is notched or serrated on its inner end having teeth 35 for engagement with the teeth 38. Likewise the outer end of hub 24 may be serrated for interlocking engagement with teeth 40 milled in the hub 34.

The outer wheel 16 is provided with a hub portion 42 which is rotatably journaled about the inner wheel hub 24 by a pair of spaced bearing assemblies 44. In this manner the wheels of the dual wheel assembly are journaled for independent rotation. The entire dual wheel structure is secured in place on the axle housing by a suitable nut assembly 46 threaded to the extremity 14 of the axle housing.

The outer wheel 16 is provided with a circumferential flange 48 which extends outwardly of the asesmbly. To the outer end of this flange is secured an annular plate 50 which is curved outwardly as shown to provide clearance on the inner side of the wheel. A hub cap 52 is secured to the annular plate 50 and completes the protective covering afforded by the flange 48 and the plate 50. The flange 48, the plate 50 and the hub 42 of the outer wheel form an annular enclosure or housing in which a differential gear mechanism is located. This differential mechanism as will become more fully apparent hereinafter extends circumferentially around the axle housing 12 within the housing provided therefor.

The differential gear mechanism, illustrated in the embodiment of the invention in Fig. 1, comprises a pair of bevel gear wheels 54 and 56 mounted in spaced opposed axial relationship and a plurality of small pinions or compensating gears 58 mounted at spaced points circumferentially around the axle housing 12. Gear wheel 54 is secured to the outer wheel 16 by means of bolts 60 arranged at intervals around the wheel to drive the outer wheel. Gear wheel 56 is secured to the hub 34 by a series of bolts 62. As previously explained, the hub 34 is geared to hub 24 of the inner wheel and it is by means of this connection that gear 56 drives the inner wheel.

The compensating gears 58 are arranged in spaced relation circumferentially around the axle housing and between the bevel gears 54 and 56. Each compensating gear has a spindle 64 running free in a differential supporting member or frame 66. These spindles extend radially of the axle housing and permit independent rotation of the gears 58. The differential support or frame member 66 may be disc shaped or in the form of a spider and curved inwardly adjacent its periphery to form suitable journals 68 for the spindles 64. The frame 66 may be removably secured to the outer end of the live axle 10 in any suitable manner. As shown in the drawings the outer end of the live axle is provided with a tapered spline 70 over which the differential support 66 is fitted. The differential support 66 is secured in place on the axle by a nut assembly 72.

In Fig. 3 I have illustrated a modified form of the invention. In this embodiment of the invention the gear wheels of the differential mechanism to which the outer and inner wheels are connected are disposed in radial spaced apart relationship instead of axial spaced apart relationship as in the embodiment in Fig. 1. In Fig. 3 the parts of the structure which are the same as in Fig. 1 are referred to by the same reference numerals.

Referring in detail to Fig. 3, the outer wheel 16 is provided with a circumferential flange 80 to the outer edge of which is secured a ring shaped gear member 82 through which the outer wheel is driven. Hub 34 carries a ring shaped gear member 84 disposed radially within the plane of the gear member 82. Between these two gear members and geared therewith are positioned a plurality of pinions 86 arranged circumferentially around the axle housing 14. The arrangement of these parts, the members 82 and 84, and the pinions 86, form a differential drive mechanism wholly contained within the plane of the dual wheel asesmbly as in the previous embodiment.

Each pinion 86 is journaled for rotation about a hub 88 formed integrally with a differential pinion support or frame 90. Each pinion 86 is retained on its respective hub by means of a washer 92 which in turn is secured in place by a bolt and nut assembly generally indicated at 94. The pinion support 90 is splined to the axle 10 in the same manner as illustrated in Fig. 1. To form the housing for the differential mechanism, an annular plate 96 is secured to the flange 80 by the same bolts which secure the gear member 82 thereto. A hub cap 98 completes the assembly of the housing and protects the internal parts of the dual wheel structure from dust and dirt. The brake structure illustrated in Fig. 1 is similar to that shown in my Patent No. 2,001,875.

The operation of the differential gear mechanism described herein is readily understood from the drawings. Upon rotation of the axle 10, the small compensating pinions 58 in Fig. 1 or 86 in Fig. 3 will revolve around the axle housing. The revolution of these pinions will impart rotation to the gear wheels secured to the road wheels of the dual wheel assembly 54 and 56 in Fig. 1. Normally when the vehicle is driven in a straight course on an even roadway, the road wheels 16 and 18, even though they are independently rotatable, will be driven at the same speed. If, however, the vehicle is turned from its course or if one wheel encounters greater resistance to turning than the other, the individually rotatable character of the pinions will allow one road wheel to be driven at a different speed than the other to compensate for the irregular driving conditions. The principle of differential drive mechanisms accomplishing this function is readily understood by those skilled in the art.

The importance of this invention resides in the novel association of the parts accomplishing a differential drive for dual wheel assemblies. The differential drive mechanism forms a part of the dual wheel assembly. It is carried within the dual wheel assembly and is attachable and removable along with the road wheels of the assembly. This assembly lends itself particularly to standard vehicle constructions. Very little alteration, or none at all in certain instances, is necessary in order to mount the dual wheel assembly of this invention upon the driving axles of motor vehicles. In addition the differential drive is conveniently housed with the plane of the dual wheel assembly and lends itself readily for inspection, adjustment, and replacement of parts.

What I claim:

1. In a motor vehicle dual wheel assembly, a tubular axle housing, a live axle extending through said housing, the inner wheel of said assembly having a hub rotatably supported upon said axle housing, said inner wheel hub having a tubular portion encircling said housing and projecting toward the outer wheel, the outer wheel of said assembly having a hub rotatably supported upon said tubular projection of the inner wheel hub for rotation of the outer wheel independently of the inner wheel, a ring gear secured to the hub of the outer wheel, a complementary ring gear disposed within the plane of the outer wheel and provided with a tubular portion projecting toward the inner wheel and telescoped with and connected for rotation with the outwardly projecting tubular portion of the inner wheel hub, differential drive pinions positioned between and having driving engagement with said ring gears, and means carried by the live axle for rotation therewith supporting said drive pinions to revolve the same.

2. In a motor vehicle dual wheel assembly, a tubular axle housing, a live axle extending through said housing, the inner wheel of said assembly having a tubular hub rotatably supported on said housing, the outer wheel of said assembly having a hub rotatably supported upon the hub of the inner wheel for rotation of the outer wheel independently of the inner wheel, a housing carried by the outer wheel hub and cooperating therewith forming a chamber surrounding the outer end of said axle housing and live axle, a ring gear within said chamber secured to the hub of the outer wheel to rotate therewith, a second ring gear within said chamber and having a tubular hub portion telescoped into and secured to rotate with the hub of the inner wheel, differential drive pinions positioned between said ring gears and connected therewith to differentially drive the same, said differential drive pinions coupled with the live axles to revolve therewith.

3. In a motor vehicle dual wheel assembly, a tubular axle housing, a live axle extending through said housing, the inner wheel of said dual assembly having a tubular hub rotatably supported upon said axle housing, the outer wheel of said assembly having a tubular hub rotatably supported upon the hub of the inner wheel for rotation of the outer wheel independently of the inner wheel, said outer wheel hub having an outer end portion of enlarged diameter, a housing member secured to said portion of enlarged diameter forming therewith a chamber surrounding the outer end of the axle housing and the live axle, a ring gear disposed within said chamber and secured to the hub of the outer wheel to rotate therewith, a second ring gear disposed within said chamber and having a tubular hub element connected with the tubular hub element of the inner wheel to rotate therewith, both ring gears being located entirely within the plane of the outer wheel offset outwardly the rotatable support of the outer wheel hub upon the inner wheel hub, a differential pinion support disposed entirely within the plane of the outer wheel connected with the live axle to rotate therewith and surrounding the ring gears, and pinions carried by said support disposed between said ring gears coupled therewith to drive them.

4. In a motor vehicle dual wheel assembly, a tubular axle housing, a live axle extending through said housing, the inner wheel of said assembly having a tubular hub rotatably supported upon said housing, the outer wheel of said assembly having a hub provided with an inner end portion rotatably supported upon the tubular hub of the inner wheel for rotation of the outer wheel independently of the inner wheel, said outer wheel hub provided with an outer end portion having a diameter greater than that of its inner end portion, a housing member secured to the outer end portion of the hub of the outer wheel and forming therewith a chamber surrounding the outer end of said tubular axle housing and live axle, a tubular hub element disposed within said chamber and rotatably supported upon said tubular axle housing and connected with the tubular hub of the inner wheel to rotate as one piece therewith, a ring gear positioned within said chamber and within the plane of the outer wheel encircling said tubular hub element and carried thereby to rotate with the hub of the inner wheel, a second ring gear disposed within said chamber and connected with the hub of the outer wheel to rotate therewith, a differential pinion support carried by the outer end of the live axle to rotate therewith, said pinion support disposed within said chamber and having a part surrounding said ring gears; and a plurality of differential pinions carried by said support and projecting toward the live axle between said ring gears and enmeshed with said gears for differential driving.

JAMES F. HIGBEE.